Sept. 8, 1959  A. C. WOODWARD  2,902,870
THROTTLE VALVE CONTROL

Filed March 6, 1956  4 Sheets-Sheet 1

INVENTOR.
Arthur C. Woodward
BY
Abbott Spear
ATTORNEY

Sept. 8, 1959   A. C. WOODWARD   2,902,870
THROTTLE VALVE CONTROL
Filed March 6, 1956   4 Sheets-Sheet 2

INVENTOR.
Arthur C. Woodward
BY
Abbott Spear
ATTORNEY

Sept. 8, 1959   A. C. WOODWARD   2,902,870
THROTTLE VALVE CONTROL
Filed March 6, 1956   4 Sheets-Sheet 3

INVENTOR.
Arthur C. Woodward
BY
ATTORNEY

Sept. 8, 1959     A. C. WOODWARD     2,902,870
THROTTLE VALVE CONTROL

Filed March 6, 1956     4 Sheets-Sheet 4

INVENTOR.
Arthur C. Woodward
BY
Abbott H. Spear
ATTORNEY

United States Patent Office 2,902,870
Patented Sept. 8, 1959

2,902,870

THROTTLE VALVE CONTROL

Arthur C. Woodward, Nahant, Mass.

Application March 6, 1956, Serial No. 569,872

5 Claims. (Cl. 74—126)

This invention relates to controls of the type provided with a ratchet wheel which is capable of being turned, by steps, in either direction and also released, for immediate return, to its starting point, from any stepped-up position.

While such controls are adapted for various uses such as those referred to in my copending applications Serial No. 394,412 filed November 25, 1952, now Patent No. 2,762,444, and Serial No. 508,886 filed May 17, 1955, their use with marine engines illustrates requirements not met by previous devices. Among these requirements, rugged construction and positive operation are generally indicative of those that result in minimum service needs and avoidance of failures in use attributable to vibration and wear. Meeting these requirements is the principal objective of this invention.

In accordance with the present invention, a control for a ratchet wheel that is rotated in one direction by a spring has a spring-backed pawl carried by a pivotable and slidable arm. Resilient means manually hold the arm positioned to be moved linearly with its pawl in engagement with the wheel, thus to step the wheel against the action of the wheel rotating spring. A pivoted holding dog is yieldably held by resilient means in engagement with the wheel and a pivoted escapement is urged by a spring into engagement with the wheel but is held from such engagement by the arm when the pawl is operatively disposed. First actuating means, including a first solenoid, are pivotally connected to the arm and operative to effect linear stepping-up movement thereof and second actuating means, including a second solenoid, are also pivotally connected to the arm and operative to pivot said arm to disengage the pawl from the ratchet wheel and to enable the escapement to be operative.

The second actuating means also is provided with a part connected to the dog, when the second solenoid is energized, to disengage it from the wheel. The arm and the escapement also are provided with portions that coact, when the first solenoid is energized, to render the escapement spring inoperative when the second solenoid is energized thus to effect the full return of the ratchet wheel to its starting point from any stepped-up position when solenoids of both actuating means are energized.

Such a control meets the generally stated objectives since it provides that the stepping-up rotation of the ratchet wheel, against the action of its spring, is accomplished by positive and accurate movement of the arm by the energized first solenoid. Additionally, the pawl, arm, holding dog and the two actuating means are simple and rugged and so coact as to render the control operative under adverse conditions, ensuring long, trouble-free service.

In the accompanying drawings, there is shown an illustrative embodiment of the invention from which these and other of its objectives, novel features and advantages will be readily apparent.

In the drawings:

Fig. 1 is a somewhat diagrammatic plan view illustrating a boat equipped with a control in accordance with the invention, Fig. 2 is a plan view of the control with its cover partly broken away, Fig. 3 is a bottom view of the control with its base partly broken away to show certain parts, Fig. 4 is a section taken through the crank pins of the solenoids showing the parts in their normal position, their position when the first solenoid is energized, being indicated by broken lines, Fig. 5 is a similar view with the broken line position of the parts being that effected when the second solenoid is energized.

Figure 1:
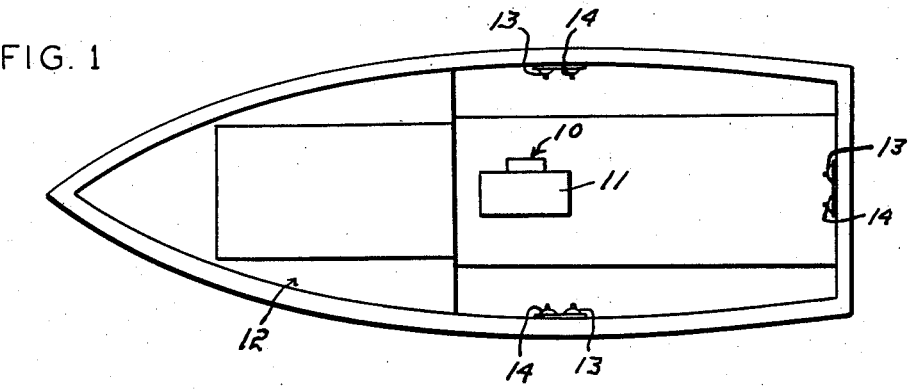

In the embodiment of the invention shown in the drawings, the control housing, generally indicated at 10, is adapted to be attached to an engine, such as the marine engine 11, with which the boat 12 is equipped and which is indicated as having pairs of switches 13 and 14 spaced to be conveniently accessible in controlling its speed.

Figure 2:
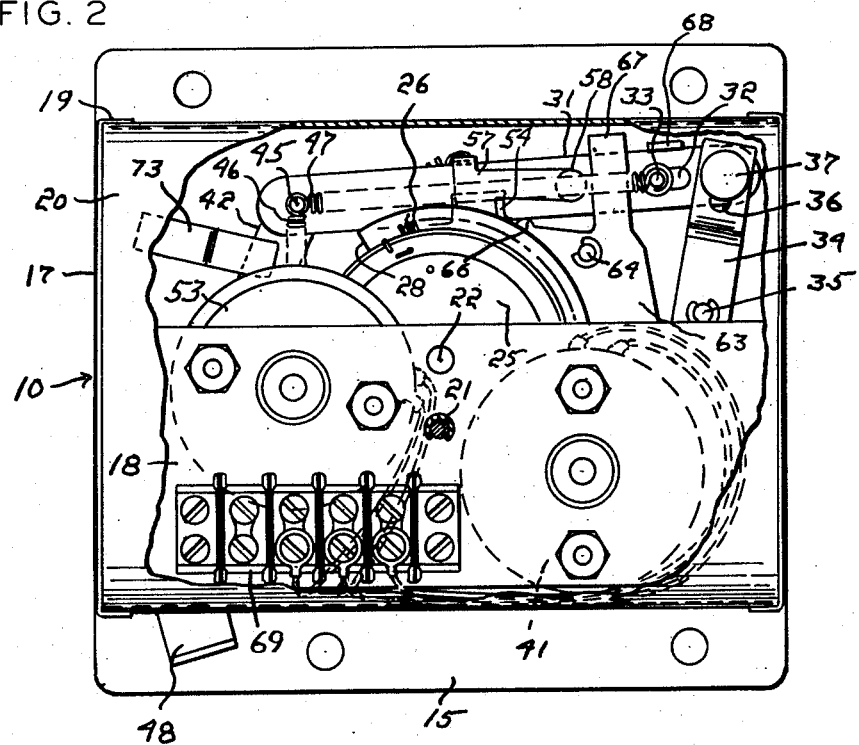
Figure 3:
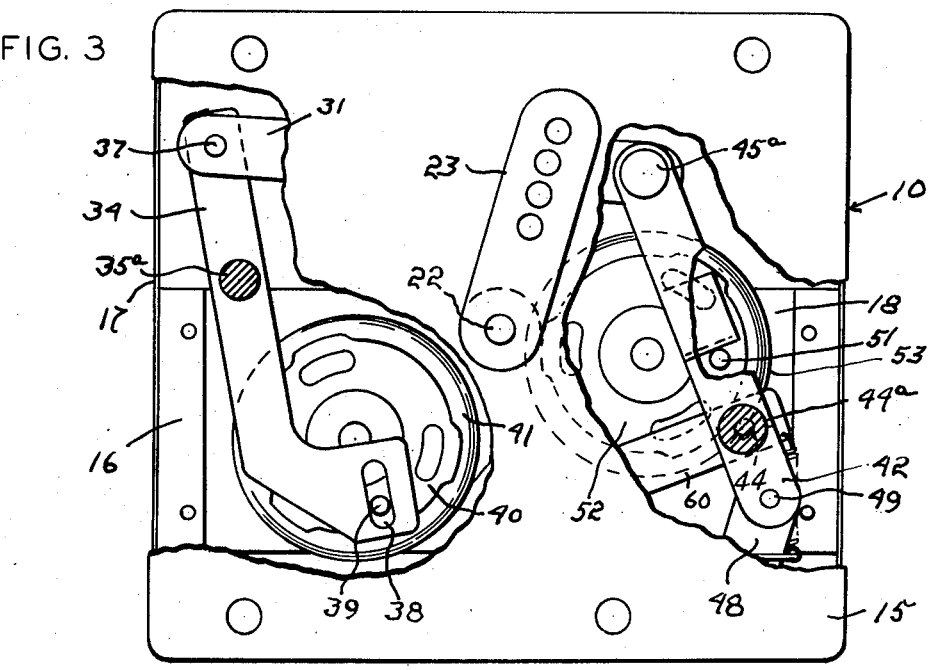

The housing 10 has a base 15 to which is secured the bottom flanges 16 of the end walls 17 (see Figs. 2 and 3) with which a mount 18 is provided. The end walls 17 have inturned flanges 19. The housing is provided with a cover 20 caught by the flanges 19 and locked to the mount 18 as by the screw 21 (see Fig. 2).

Rotatably supported by the base 15 and the mount 18 is a shaft 22 on whose exposed end there is locked a crank 23 adapted to be operatively connected to the throttle valve of the engine 11 in any desired way. Fast on the shaft 22 between the base 15 and the mount 18 is the sprocket 24 including an integral pulley part 25 about which is trained a spring 26 with one end connected thereto and the other end anchored as to the slotted guide 27 which is operative to urge rotation of the shaft 22 in a direction to close the throttle valve. The pulley 25 has one of its walls cut away to provide spaced shoulders 28 and 29 engageable with a stop 30 on the base 15 thus to limit the extent to which its ratchet wheel may be stepped-up and to establish a starting point.

An arm 31 is slotted as at 32 to receive the pivot 33 thus to be slidable as well as pivotable relative thereto. An arm 34, pivoted to the base 15 as at 35, has one end slotted as at 36 to receive the pivot 37 by which it is connected to one end of the arm 31. At its other end, the arm 34 is slotted as at 38 to receive the crank pin 39 on a rotatable part 40 of the solenoid 41.

An arm 42 is slotted as at 43 to receive the pivot 44 (see Fig. 3) thus to be pivotable and slidable relative thereto. Corresponding ends of the arm 31 and the arm 42 are pivotally interconnected as at 45 to which connection 45 there is shown a spring 46 anchored to the guide 27 and a spring 47 anchored to the pivot 33.

A manually operable link 48 is slidably supported by the guide 27 and is pivotally connected as at 49 to the proximate end of the arm 42. The arm 42 is provided with a shoulder 50 engageable by the crank pin 51 carried by the rotatable part 52 of the solenoid 53.

Figure 4:
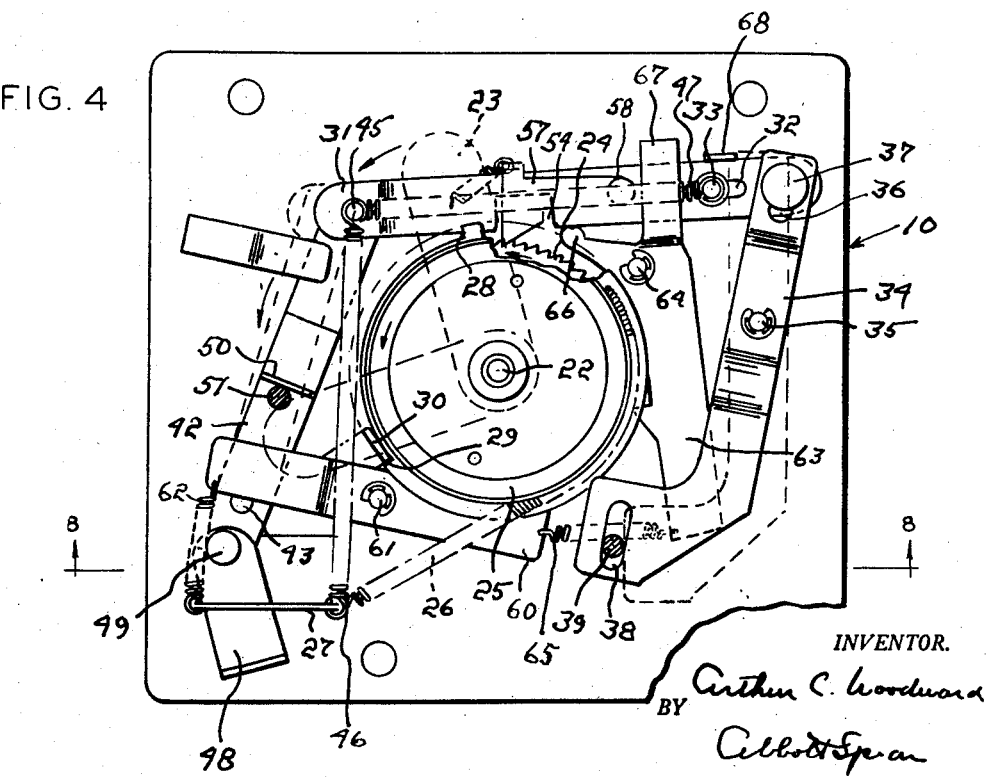
Figure 7:
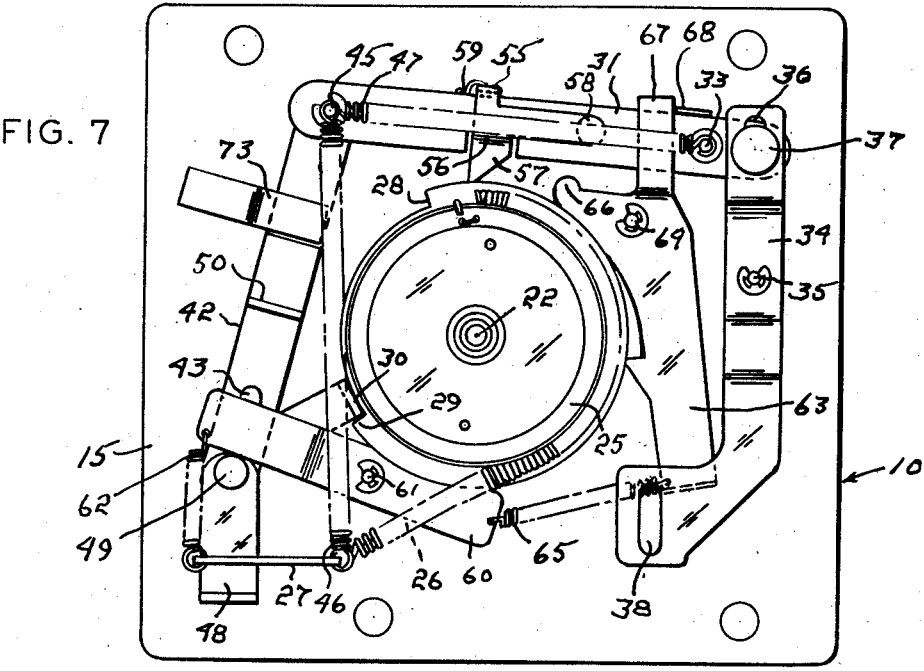
Fig. 7 is a similar view showing the position of the parts when both solenoids are energized.
Figure 8:
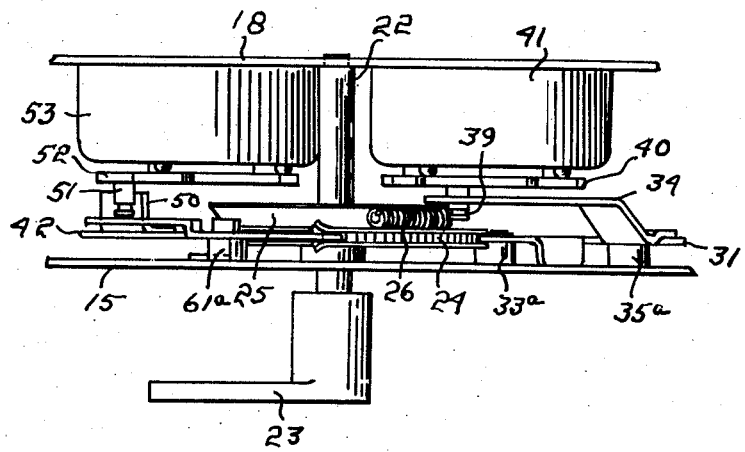
Fig. 8 is a fragmentary side elevation.

The arm 31 is notched as at 54 to be freely entered between the spaced shoulders 55 and 56 (see Fig. 7) of the pawl 57 which is pivoted to the arm 31 as at 58 to swing between operative and inoperative positions. A spring 59 urges the pawl 57 into its operative position. This operative position is that in which the arms 31 and 42 are yieldably held by the springs 46 and 47 bringing the pawl 57 into engagement with the ratchet wheel 24. When the solenoid 41 is energized, the arm 31 is moved in an approximately linear direction into its broken line position shown in Fig. 4 to step the ratchet wheel 24 positively against the action of its spring 26.

Figure 5:
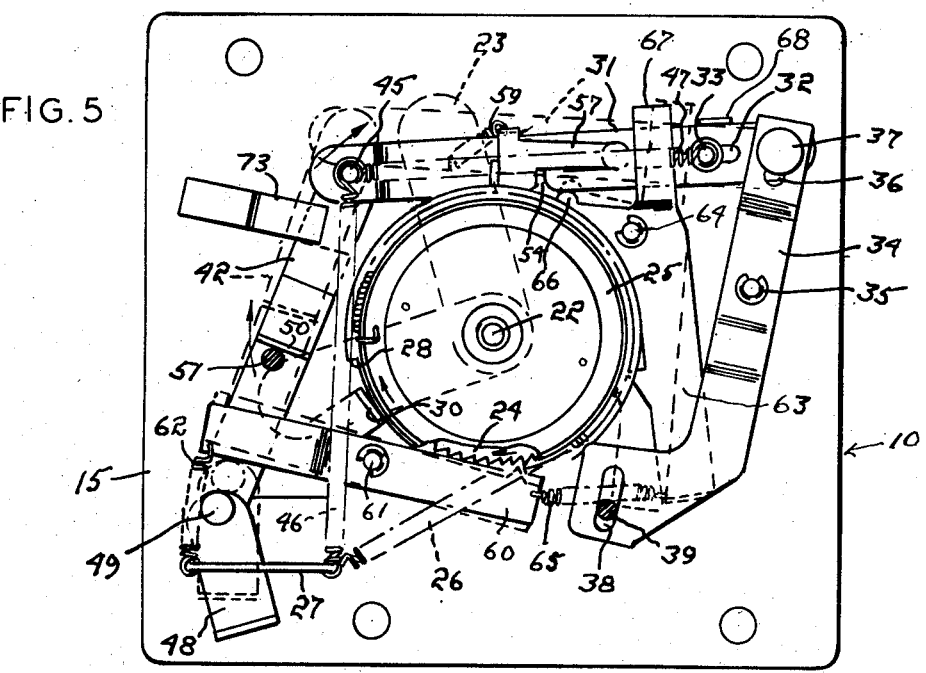

When the link 48 is manually pushed against the action of the spring 46 or when the solenoid 53 is energized, the arm 42 is advanced from its solid to its broken line position, shown in Fig. 5, to swing the arm 31 to disengage the pawl 57 from the ratchet wheel 24.

A dog 60 pivoted to the base 15 as at 61 is urged yieldably into holding engagement with the ratchet wheel by a spring 62 also shown as anchored to the guide 27. The free end of the dog 60 so overlies the arm 42 as to be engaged by the pivot 49 whenever the arm 42 is moved to effect disengagement of the pawl 57 from the ratchet wheel 24 thus to effect the swinging of the dog 60 out of holding engagement with said ratchet wheel. When the holding dog 60 and the pawl 57 are thus disengaged, an escapement 63 becomes operative to limit the rotation of the ratchet wheel 24 by its spring to the single step. The escapement 63 is pivoted to the base 15 as at 64 and is yieldably urged into a position engaging the ratchet wheel by a spring 65 which is shown as being connected to the holding dog 60. The escapement has a part 66 bearing on the arm 31 whenever the pawl 57 is in engagement with the ratchet wheel and thus the escapement is inoperative until the arm 31 is pivoted to disengage said pawl.

In order that the ratchet wheel may be rotated all the way to its starting point from any stepped-up position, the escapement 63 is provided with a part 67 engageable with a part 68 on the arm 31 whenever the first solenoid is energized and thus prevents the escapement spring 65 from then being operative when the second solenoid is energized.

Figure 6:
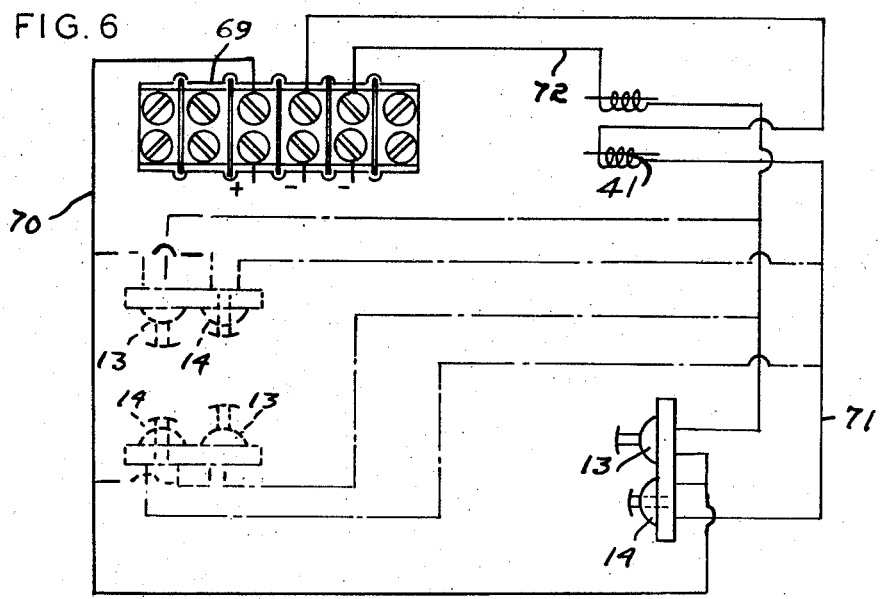
Fig. 6 is a somewhat schematic view of the operating circuit.

In Fig. 6 there is indicated a connector 69 to which are connected leads 70 and 71 and 72. The lead 70 contains the series of switches 13 and the series of switches 14 both arranged in parallel therein. The lead 71 is connected in parallel with the switches 14 and includes the solenoid 41 and the lead 72 is similarly connected to the switches 13 and includes the solenoid 53.

From the foregoing, it will be apparent that each time a switch 13 is closed, the ratchet wheel is stepped in a direction to advance the throttle valve opening one step. Each time a switch 14 is closed, the ratchet wheel is stepped in the opposite direction to effect the gradual closing of the throttle valve. When a switch 13 and a switch 14 are simultaneously closed, the ratchet wheel returns all the way to its starting point, closing the throttle valve.

It will be noted that the pivots 33, 35, 44 and 45 include spacer portions 33ª, 35ª, 44ª, 45ª, and 61ª and that the base 15 carries a retainer 73 overlying the arm 42 adjacent its pivotal interconnection 45 with the arm 31.

From the foregoing, it will be apparent that a control in accordance with the invention thus combines ruggedness and simplicity of construction with positive and reliable operation rendering it well adapted to meet the rigorous requirements of marine usages.

What I therefore claim and desire to secure by Letters Patent is:

1. In a control operable by steps in either of two directions and for full return to the startting point from any stepped-up position, a ratchet wheel, a spring urging rotation of said wheel in one direction, a slidable and pivotable arm, a spring backed pawl carried by said arm, means resiliently holding said arm in a linearly movable position in which said pawl engages the wheel, a pivoted holding dog, resilient means yieldably holding said dog in engagement with said wheel, a pivoted escapement, a spring yieldably urging said escapement into engagement with said wheel, said arm and said escapement including portions rendering said escapement spring inoperative when said pawl is operatively positioned, first means pivotally connected to said arm and operable to move it linearly to effect a stepping-up movement of said wheel against the action of said wheel spring and including a first solenoid, second means pivotally connected to said arm and operable to pivot it to disengage the pawl from the wheel and to render said escapement spring operative and including a second solenoid, and a connection between said second means and said dog operable, when the second solenoid is energized, to disengage said dog from said wheel.

2. In a control operable by steps in either of two directions and for full return to a starting point from any stepped-up position, a ratchet wheel, a spring urging rotation of said wheel in one direction, a slidable and pivotable arm, a spring backed pawl carried by said arm, means resiliently holding said arm in linearly movable position in which said pawl engages the wheel, a pivoted holding dog, resilient means yieldably holding said dog in engagement with said wheel, a pivoted escapement, a spring yieldably urging said escapement into engagement with said wheel, said arm and said escapement including portions rendering said escapement spring inoperative when said pawl is operatively positioned, first means including a pivotable link pivotally connected to one end of said arm, and a first solenoid operatively connected to said link and operable to move said arm linearly to cause said pawl to advance said wheel a step against the action of said wheel spring, second means including a second link pivotally connected to the other end of said arm and a second solenoid connected to said second link and operable to pivot said arm to disengage the pawl from the wheel and to render said escapement spring operative, and said second means also including a connection between said second link and said dog operable, when the second solenoid is energized, to disengage said dog from said wheel.

3. In a control operable by steps in either of two directions and for full return to a starting point from any stepped-up position, a ratchet wheel, a spring urging rotation of said wheel in one direction, a first slidable and pivotable arm, a spring backed pawl carried by said arm, a second slidable and pivotable arm pivotably connected to said first arm, means resiliently holding said first arm in a position in which said pawl engages the wheel and is linearly movable to step the wheel against the action of its spring, a pivoted holding dog, resilient means yieldably holding said dog in engagement with said wheel, a pivoted escapement, a spring yieldably urging said escapement into engagement with said wheel, said arm and said escapement including portions rendering said escapement spring inoperative when said pawl is operatively positioned, first solenoid operating means moving to said first arm linearly, second solenoid operated means pivotally connected to said second arm and operable to actuate it to pivot said first arm to disengage the pawl from the wheel and to render said escapement spring operative, and a disengaging connection between said second arm and said dog effective, when the second solenoid operated means is energized, to disengage said dog from said wheel.

4. In a control operable by steps in either of two directions and for full return to a starting point from any stepped-up position, a ratchet wheel, a spring urging rotation of said wheel in one direction, a first slidable and pivotable arm, a spring backed pawl carried by said arm, a second slidable and pivotable arm pivotally connected to said first arm, means resiliently holding said first arm in a position in which said pawl engages the wheel and is linearly movable to step the wheel against the action of its spring, a pivoted holding dog, resilient means yieldably holding said dog in engagement with said wheel, a pivoted escapement, a spring yieldably urging said escapement into engagement with said wheel, said first arm and said escapement including portions rendering said escapement spring inoperative when said pawl is operatively positioned, first solenoid operated means to move said first arm linearly, second solenoid operated means pivotally connected to said second arm and operable to actuate it to pivot said first arm to disengage the pawl from the wheel and to render said escapement spring inoperative, a disengaging connection between said second arm and said dog, effective, when the second solenoid operated means is energized, to disengage said dog from said wheel, and a manually engageable member pivotally connected to said second arm.

5. In a control operable by steps in either of two directions and for full return to a starting point from any stepped-up position, a ratchet wheel, a spring urging rotation of said wheel in one direction, a first slidable and pivotable arm, a spring backed pawl carried by said arm, a second slidable and pivotable arm pivotally connected to said first arm, means resiliently holding said first arm in a position in which said pawl engages the wheel and is linearly movable to step the wheel against the action of its spring, a pivoted holding dog, resilient means yieldably holding said dog in engagement with said wheel, a pivoted escapement, a spring yieldably urging said escapement into engagement with said wheel, said first arm and said escapement including portions rendering said escapement spring inoperative when said pawl is operatively positioned, first solenoid operated means to move said first arm linearly, and a second solenoid operated means pivotally connected to said second arm operable to actuate it to pivot said first arm to disengage the pawl from the wheel and to render said escapement spring operative and a disengaging connection between said second arm and said dog, effective, when the second solenoid operated means is energized, to disengage said dog from said wheel.

References Cited in the file of this patent
UNITED STATES PATENTS

| | | |
|---|---|---|
| 2,467,574 | Williams | Apr. 19, 1949 |
| 2,851,619 | Jones | Sept. 9, 1958 |